(12) United States Patent
Kishima et al.

(10) Patent No.: US 6,552,968 B1
(45) Date of Patent: Apr. 22, 2003

(54) OPTICAL RECORDING MEDIUM, METHOD OF PRODUCING SAME, AND OPTICAL RECORDING AND REPRODUCTION DEVICE

(75) Inventors: Koichiro Kishima, Kanagawa (JP); Yuji Kuroda, Tokyo (JP); Isao Ichimura, Tokyo (JP); Kiyoshi Osato, Chiba (JP); Kimihiro Saito, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/612,367

(22) Filed: Jul. 7, 2000

(30) Foreign Application Priority Data

Jul. 9, 1999 (JP) ............................................. 11-196743

(51) Int. Cl.[7] .......................... G11B 7/24; G11B 11/105
(52) U.S. Cl. .................................................. 369/13.38
(58) Field of Search ....................... 369/13.33, 13.35, 369/13.38, 13.4, 13.53, 275.1, 275.2, 275.5, 283, 284, 285; 428/694 ML, 694 DE

(56) References Cited

U.S. PATENT DOCUMENTS 5,341,349 A * 8/1994 Kagami et al. ............... 360/59
5,620,792 A * 4/1997 Challener, IV ............. 369/13.4
5,665,468 A * 9/1997 Sekiya et al. .............. 369/13.4
5,930,207 A * 7/1999 Abiko ....................... 369/13.4

FOREIGN PATENT DOCUMENTS

JP          05-174433          * 7/1993

* cited by examiner

Primary Examiner—David L. Ometz
(74) Attorney, Agent, or Firm—Sonnenschein, Nath & Rosenthal

(57) ABSTRACT

An optical recording medium for at least one of recording and reproduction of information by focusing of light from an optical system on a recording layer, comprising a substrate, a recording layer formed on the substrate, a first protective layer formed on the recording layer, and an antireflection multilayer film, designed to be positioned at a near field distance from the optical system, formed on the first protective layer for preventing reflection of the light at the surface of the first protective layer and having predetermined optical characteristics for moderating a change of a reproduced signal intensity along with fluctuation of a distance between the antireflection multilayer film and the optical system, a method of producing the medium, and an optical recording and reproduction device including the medium.

26 Claims, 7 Drawing Sheets

US 6,552,968 B1

OPTICAL RECORDING MEDIUM, METHOD OF PRODUCING SAME, AND OPTICAL RECORDING AND REPRODUCTION DEVICE

RELATED APPLICATION DATA

The present application claim priority to Japanese Application No. P11-196743 filed Jul. 9, 1999; which application is incorporated herein by reference to the extent permitted by law.

BACKGROUND OF THE INVENTION

1. Field of the Invention

The present invention relates to an optical recording medium, a method of producing the same, and an optical recording and reproduction device, more particularly an optical recording medium used in the near field and preventing a decrease of intensity of reproduced signals accompanying fluctuation of the distance between the optical recording medium and optical system and preventing damage due to collision with an optical system and a method of producing the same and an optical recording and reproduction device including the optical recording medium.

2. Description of the Related Art

Up to now, a hard disk or other magnetic recording medium has been used in a state with a head for recording and reproduction brought into extremely close proximity to the disk or other medium for the purpose of obtaining good signal characteristics. As opposed to this, a phase change type optical disk, magneto-optical disk, or other optical recording medium has been used in a state with the optical system or head for recording and reproduction separated from the recording medium by a predetermined distance.

However, in recent years, in the devices used for optical recording media, the system of bringing the optical system or head into close proximity, for example, 200 nm with the disk (near field) has begun to be employed for the purpose of increasing a numerical aperture (NA) of the optical system and thereby increasing a recording density of the disk.

As an optical recording medium device used at the near field, for example, there are an optical hard disk structured with a lens mounted on a slider, an optical disk device with a lens made movable by an electromagnetic actuator, etc. In these devices, light for recording and reproduction is focused on the recording medium by an optical system comprised of a plurality of lenses including at least an objective lens and a solid immersion lens (SIL). Due to this, an NA of over 1 has been obtained.

FIG. 1 is a schematic view of a hard disk. The disk 1 is structured with a recording layer 3 and a lubrication film 4 stacked on a substrate 2. A recording and reproducing head 5 for changing the magnetization of the recording layer 3 is mounted on a slider 6 and movable in the direction of the disk plane. The lubrication film 4 is provided for preventing abrasion of the head 5 and the disk 1. The lubrication film 4 can be formed, for example, by coating a fluorine compound. In the case of an optical disk, consideration of optical conditions is required for a layer formed on a recording layer, but the lubrication film 4 of a hard disk does not require consideration of optical conditions as required for the optical disk. Therefore, it can be relatively easily formed.

FIG. 2 is a schematic view of a conventional optical disk with a large distance between an optical system or head and the disk, for example, a phase change type optical disk or a magneto-optical disk. The optical disk of FIG. 2 is structured with a dielectric protective layer 12, a recording layer 13, a dielectric protective layer 14, a reflective film 15, and a resinous protective layer 16 sequentially stacked on a substrate 11. In the case of a phase change type optical disk, a material changing in phase by focusing of light is used for the recording layer 13. In the case of a magneto-optical disk, a material changing in magnetization state using focusing of light is used for the recording layer 13.

In the optical disk of FIG. 2, both surfaces of the recording layer 13 are protected by the dielectric protective layers 12, 14. These surfaces are further protected by the substrate 11 or the resinous protective layer 16. A distance between a lens 17 and the disk is much larger than that of a hard disk. A film for dealing with friction or collision between the lens 17 or head and the disk is usually preferable, but not necessary.

FIG. 3 is a cross-sectional view of an optical disk used in the near field. It is structured by a reflective layer 22, a second dielectric layer 23, a recording layer 24, and a first dielectric layer 25 sequentially stacked on a substrate 21. In the case of the optical disk shown in FIG. 2, light is focused from the side at which the transparent substrate 11 is formed. On the other hand, in the case of the optical disk for near-field use shown in FIG. 3, light is focused from the side at which the first dielectric layer 25 is formed. Due to this, the increase in the coma along with an increase in the NA is moderated.

In the optical disk of FIG. 3, the four layers of the first dielectric layer 25, the recording layer 24, the second dielectric layer 23, and the reflective layer 22 are optimized in design for obtaining good signal characteristics for light striking the disk surface perpendicularly.

On the other hand, in the case of a near-field optical disk device having a short distance between the head and the disk as described above, the risk of collision of a head or a lens and the rest of the optical system with the disk becomes extremely high. However, it is very difficult to uniformly coat a lubricating substance such as used for the lubrication film 4 of the hard disk on the surface of an optical disk to form a thin film satisfying the optical conditions. Also, in the case of a near-field configuration, the fluorine material used for the lubrication film 4 of a hard disk cannot be used because the refractive index is too low. There are few other suitable materials.

When an antireflection coating (AR coating) is provided on the surface of the lens, once the AR coating at the lens side is damaged due to collision, the recording and reproduction are influenced by the damage at all times. That is, a change of the optical characteristics of the entire device is caused. However, it is difficult to find a suitable coating material resistant to damage by collision as the material for the AR coating.

According to a film configuration of the above conventional near-field optical disk, there is a problem that light of a component of a high NA, that is, the light having a large incident angle with respect to the recording layer 24 is hard to reach the recording layer 24. This is caused by a large reflectance at the surface of the first dielectric layer 25 with respect to the light of the component of the high NA. Also, in a state where a space (below, referenced as t) between the lens and the surface of the disk is extremely small, when t fluctuates slightly, along with this, the reflectance of the surface of the first dielectric layer 25 greatly changes.

In a phase change type optical disk of the conventional configuration shown in FIG. 3, the reflectance of the surface of the first dielectric layer was calculated with an air layer between the lens and the surface of the disk regarded as a thin layer having a refractive index n of 1 and a thickness of t when light from an optical part (lens) of n=1.8 strikes the disk with various incident angles (an increase of the incident angle corresponds to an increase of NA). The calculation was performed when the incident angle is 0°, 10°, 20°, 30°, 40° or 50°. The results of calculation are shown in FIG. 4.

As shown in FIG. 4, along with an increase of the incident angle, the reflectance of the first dielectric layer becomes higher. Also, when the thickness t of the air layer changes to about 0 to 100 nm, the reflectance of the first dielectric layer drastically rises. In the actual near-field optical disk device, the space t between the lens and the surface of the disk is usually about 50 to 200 nm. It overlaps the region where the reflectance of the first dielectric layer greatly fluctuates. Therefore, when t changes slightly due to rotation of the disk etc., a distribution of energy of light in a disk plane easily fluctuates and it becomes hard to stabilize the reproduced signal level.

Further, in the above conventional near-field optical disk, when the space t between the lens and the surface of the disk slightly fluctuates, there is a problem that the reproduced signal level greatly changes along with a change of the optical characteristics.

In the phase change type optical disk of the conventional configuration shown in FIG. 3, the intensity of the reproduced signal was calculated with an air layer between the lens and the surface of the disk regarded as a thin layer having a refractive index n=1 and a thickness of t when light from an optical part (lens) of n=1.8 strikes the disk in various incident angles. The calculation was performed in the case of the thickness t of the air layer of 0 nm, 50 nm, 100 nm, 150 nm. The results of the calculation, that is, dependency of the reproduced signal on spatial frequency are shown in FIG. 5. The reproduced signal level of the ordinate is a value equivalent to modulation transfer function (MTF) expressing the normalized intensity of the reproduced signal.

As shown in FIG. 5, when increasing the thickness t of the air layer, the reproduced signal level drastically decreases. Therefore, it is necessary to reduce the distance t between the lens and the disk for increasing the reproduced signal level. When a recording and reproducing system where the lens and the disk are brought into extremely close proximity is used, the recording layer Is easily damaged due to collision of the lens with the surface of the disk.

However, according to the conventional configuration shown in FIG. 3, the first dielectric layer 25, that is, a thin layer of for example ZnS—SiO$_2$ or SiN, is formed on the outermost layer of the disk. Therefore, when the lens and the disk collide, the first dielectric layer 25 and the recording layer 24 below the layer 25 are readily damaged.

Also, since the lens and the disk are brought into close proximity than ever before, when there is a protruding defect on the surface of the disk, the protruding part may easily contact the lens and damage the surface of the lens. If the disk surface is polished for improving the surface conditions to prevent this, then the possibility of breaking the recording layer 24 by polishing becomes high since the first dielectric layer 25 formed on the recording layer 24 is extremely thin.

Further, when only the extremely thin first dielectric layer 25 is formed on the recording layer 24, local light absorption easily occurs at the surface of the disk. If ablation occurs due to laser light at the time of recording or reproduction, the disk will be damaged and the lens contaminated by the deposition of the disk material on the lens surface.

SUMMARY OF THE INVENTION

An object of the present invention is to provide an optical recording medium used in the near field having a high coupling efficiency of focused light and able to obtain a stabilized intensity of the reproduced signal and an optical recording and reproduction device including the same.

Another object of the present invention is to provide an optical recording medium used in the near field and preventing decrease in intensity of the reproduced signal along with fluctuation of distance between the optical recording medium and an optical system and an optical recording and reproduction device including the same.

Still another object of the present invention is to provide an optical recording medium used in the near field and preventing damage due to collision with an optical system and an optical recording and reproduction device including the medium.

Another object of the present invention is to provide a method of producing an optical recording medium able to produce the above optical recording medium by a simplified process.

According to a first aspect of the present invention, there is provided an optical recording medium, comprising a substrate, a recording layer formed on the substrate, a first protective layer formed on the recording layer, and an antireflection multilayer film, designed to be used in a near field condition, formed on the first protective layer for preventing reflection of light at the surface of the first protective layer and having predetermined optical characteristics for moderating a change of a reproduced signal intensity responsive to fluctuation of the near field condition.

Preferably, the predetermined optical characteristics are determined by a refractive index and thickness of each layer comprising the antireflection multilayer film.

Preferably, the antireflection multilayer film comprises at least two layers and the outermost layer of the antireflection multilayer film has a surface hardness able to be polished. Preferably, the outermost layer of the antireflection multilayer film comprises a silicon oxide layer. Preferably, the thickness of the silicon oxide layer is about 100 nm or more. Preferably, the antireflection multilayer film comprise a plurality of silicon oxide layers.

Preferably, a surface of the antireflection multilayer film Is flattened and has no protruding defects. Preferably, there is a reflective layer comprised of metal or semimetal reflecting light formed between the substrate and the recording layer. Preferably, there is further a second protective layer formed between the substrate and the recording layer.

Preferably, the recording layer comprises a material undergoing a phase change and changing in complex index of refraction by focusing of light. Alternatively, the recording layer comprises a material changing in a magnetization state by focusing of light and enabling detection of the change as a change of a polarization state. Alternatively, the recording layer comprises an organic dye material changing in complex index of refraction or shape with respect to a wavelength of the reproduction light by focusing of light. Alternatively, the recording layer preferably comprises pits formed on a surface of the substrate and the optical recording medium is a read-only memory.

Due to this, it is made possible to decrease the reflectance and increase the coupling efficiency even with respect to light not striking the surface of the optical recording medium perpendicularly. In other words, it is possible to improve the MTF with respect to light of a wide range of incident angles.

Therefore, it is possible to obtain a high MTF with respect to light from an optical system of a high NA.

Also, while the MTF decreases when increasing the distance between the optical system and optical recording medium, according to the optical recording medium of the present invention, it is possible to suppress a decrease of the MTF. Due to this, it is made possible to increase the distance between the optical system and the optical recording medium to a certain extent. Therefore, it is possible to prevent contact or collision of the optical system with the optical recording medium.

Further, according to the optical recording medium of the present invention, since the antireflection multilayer film is formed on the surface of the optical recording medium, it is not necessary to provide an antireflection coating (AR coating) on a surface of a lens of the optical system. Therefore, it is possible to prevent damage of the antireflection coating on the surface of the lens due to collision with the optical recording medium etc. and the constant effect of the damage at the time of recording and reproduction.

According to a second aspect of the present invention, there is provided a method of producing an optical recording medium used in a near field condition, comprising the steps of forming a recording layer on a substrate, forming a first dielectric layer on the recording layer, forming an antireflection multilayer film, designed to be positioned at a near field distance from an optical system, on the first protective layer for preventing reflection of the light at the surface of the first protective layer and having predetermined optical characteristics for moderating a change of a reproduced signal intensity along with fluctuation of a distance between the antireflection multilayer film and the optical system, and flattening a surface of the antireflection multilayer film by polishing.

Preferably, the steps of forming the recording layer, first protective layer, and antireflection multilayer film are steps of forming layers by sputtering.

Preferably, the polishing step comprises flying tape polishing (FTP) for removing protruding portions.

Due to this, it is possible to form an antireflection multilayer film having a smooth surface by a simplified process. By forming each layer by sputtering, it is possible to form the layers sequentially and each layer can be formed in a uniform thickness. When the antireflection multilayer film is polished by the FTP process, it is possible to polish the film in a short time. As described above, according to the method of producing an optical recording medium of the present invention, it is possible to form a near-field optical recording medium giving a high intensity of reproduced signals and resistant to damage by a simplified process.

According to a third aspect of the present invention, there is provided an optical recording and reproduction device comprising a light source, an optical recording medium, and an optical system focusing light from the light source to the optical recording medium at a near field distance from the optical recording medium, the medium comprising a substrate, a recording layer formed on the substrate, a first protective layer formed on the recording layer, and an antireflection multilayer film formed on the first protective layer for preventing reflection of the light at a surface of the first protective layer and having predetermined optical characteristics moderating a change of reproduced signal intensity along with fluctuation of the distance, and said device performing at least one of recording and reproduction of information by focusing light from the optical system to the recording layer via a side of the optical recording medium at which the antireflection multilayer film is formed.

Preferably, the predetermined optical characteristics are determined by a refractive index and thickness of each layer comprised of the antireflection multilayer film.

Preferably, the antireflection multilayer film comprise at least two layers and the outermost layer of the antireflection multilayer film has a surface hardness able to be polished. Preferably, the outermost layer of the antireflection multilayer film comprises a silicon oxide layer. Preferably, the thickness of the silicon oxide layer is about 100 nm or more. Preferably, the antireflection multilayer film comprise a plurality of silicon oxide layers.

Preferably, a surface of the antireflection multilayer film is flattened and has no protruding defect liable to damage the optical system.

Preferably, a reflective layer comprised of a metal or semimetal is formed between the substrate and the recording layer. Preferably, a second protective layer is formed between the substrate and the recording layer.

Preferably, the recording layer comprises a material undergoing a phase change and changing in a complex index of refraction by the focusing of light. Alternatively, the recording layer comprises a material changing in a magnetization state by the focusing of light and enabling detection of the change as a change of a polarization state. Alternatively, the recording layer comprises an organic dye material changing in complex index of refraction or shape with respect to a wavelength of the reproduction light by the focusing of light. Alternatively, the recording layer preferably comprises pits formed on a surface of the substrate and the optical recording medium is a read-only memory.

Due to this, it is made possible to decrease the reflectance and increase the coupling efficiency even with respect to light not striking the surface of the optical recording medium perpendicularly. In other words, it is possible to improve the MTF with respect to light of a wide range of incident angles. Therefore, it is possible to obtain a high MTF with respect to light from an optical system of a high NA.

Also, while the MTF decreases when increasing the distance between the optical system and optical recording medium, according to the optical recording and reproduction device of the present invention, it Is possible to suppress a decrease of the MTF. Due to this, it is made possible to increase the distance between the optical system and the optical recording medium to a certain extent. Therefore, it is possible to prevent contact or collision of the optical system with the optical recording medium.

Further, according to the optical recording and reproduction device of the present invention, since the antireflection multilayer film is formed on the surface of the optical recording medium, it is not necessary to provide an antireflection coating (AR coating) on a surface of a lens of the optical system. Therefore, it is possible to prevent damage of the antireflection coating on the surface of the lens due to collision with the optical recording medium etc. and constant effect of the damage at the time of recording and reproduction.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, embodiments of the optical recording medium and the method of producing the medium of the present invention will be explained with reference to the drawings.

(First Embodiment)

Figure 6:
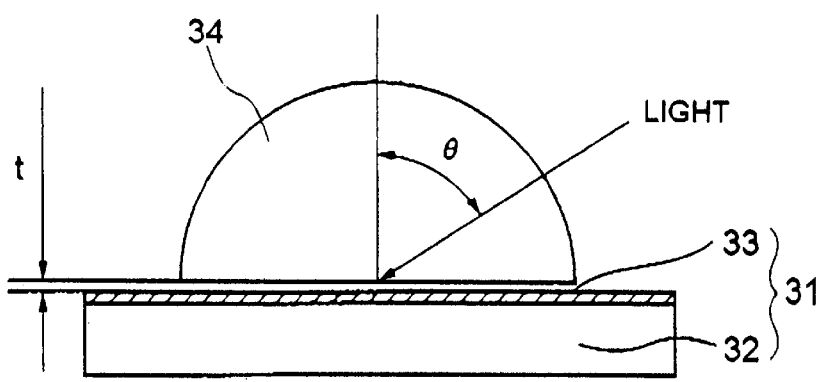
FIG. 6 is a schematic view of an arrangement of an optical recording medium of the first embodiment through the fourth embodiment of the present invention and an optical system.

FIG. 6 shows an arrangement of the optical recording medium of the present embodiment and an optical part (lens). As shown in FIG. 6, an optical disk 31 comprises a substrate 32 on which is formed a stacked film 33 including a recording layer. An SIL 34 Is arranged at the stacked film 33 side of the optical disk 31. The distance t between the surface of the stacked film 33 and the SIL 34 is extremely small, usually 200 nm or less. Since light collected by an objective lens (not shown) enters the SIL 34, the NA becomes high. Also, θ represents the incident angle of the light focused on the optical disk 31.

Figure 7:
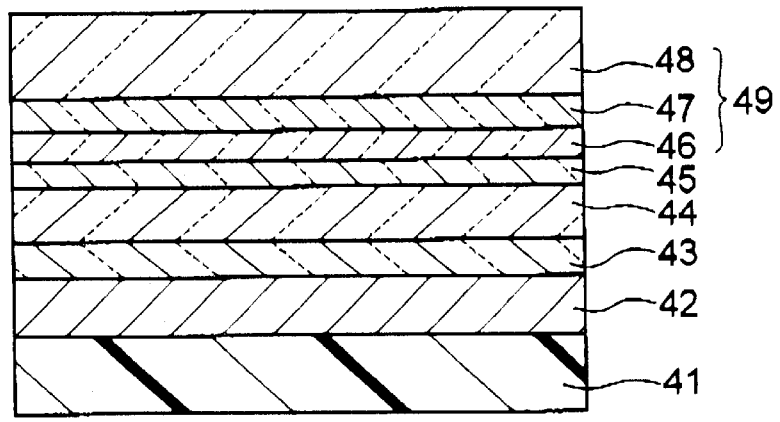
FIG. 7 is a cross-sectional view of an optical recording medium of the first embodiment through the fourth embodiment of the present invention.

FIG. 7 is a cross-sectional view of the optical recording medium of the present embodiment. The present embodiment is made a phase change type optical disk used for light of a wavelength of 650 nm. The optical disk shown in FIG. 7 is structured with a reflective layer 42, a second dielectric layer 43, a recording layer 44, and a first dielectric layer 45 sequentially stacked on a substrate 41 and, further, three layers of a third dielectric layer 46, a fourth dielectric layer 47, and a fifth dielectric layer 48 sequentially stacked on them.

Laser light is focused on the optical disk of the present embodiment from the side at which the fifth dielectric layer 48 is formed. The laser light strikes the optical disk with the line passing through the center of the beam diameter (beam waist) perpendicular to the surface of the disk.

In the optical disk of FIG. 7, the stacked film (antireflection multilayer film) 49 comprised of the three layers of the third dielectric layer 46, the fourth dielectric layer 47, and the fifth dielectric layer 48 is designed for preventing reflection of light from the optical system (lens) in various angles at the surface of the first dielectric layer 45.

The stacked film comprised of the four layers of the first dielectric layer 45, the recording layer 44, the second dielectric layer 43, and the reflective layer 42 and the antireflection multilayer film 49 described above satisfies the enhancement condition of the light perpendicularly striking the disk surface (perpendicularly incident component). The design is optimized for making the contrast higher for the perpendicularly incident component.

As the substrate 41, for example, a plastic substrate comprised of polycarbonate (PC) resins or polymethylmethacrylate (PMMA) and other acryl-based resins and a glass substrate etc. may be used.

As the reflective layer 42 on the substrate 41, for example an Al-alloy layer having a thickness of 120 nm is used. The thickness of the reflective layer 42 is set at, for example, about 50 to 200 nm. The reflective layer 42 not only reflects the light focused on the optical disk, but also functions to promote the dispersion of heat from the recording layer 44. While the temperature of the recording layer 44 rises due to absorption of light, the reflective layer 42 has a high heat conductivity since it is usually composed of a metal layer and acts as a kind of heat sink. As the material of the reflective layer 42, as long as the material has a predetermined reflectance and heat conductivity, it Is also possible to use a semimetal, a compound of metal or semimetal, and semiconductors and their compounds in addition to metal.

As the second dielectric layer 43 on the reflective layer 42, for example, a ZnS—SiO$_2$ layer having a refractive index n=2.16 and a thickness of 40 nm is used. The second dielectric layer 43 functions as a protective layer of the phase changing recording layer 44. The second dielectric layer 43 need not necessarily be formed, for example, when not rewriting on the optical disk and in other cases.

As the recording layer 44 on the second dielectric layer 43, for example, a Ge—Sb—Te layer having a refractive index n=3.9, a quenching coefficient k=3.5, and a thickness of 20 nm is used. For the recording layer 44, a material changing in phase reversibly between a crystal and amorphous state by focusing of a laser may be used. For example, chalcogens or chalcogen compounds, specifically, a system including Te, Se, Ge—Te, Ge—Sb—Te, Ge—Te Sb—Te, In—Sb—Te, Ag—In—Sb—Te, Au—In—Sb—Te, Ge—Sb—Te—Se, In—Sb—Se, Bi—Te, Bi—Se, Sb—Se, Sb—Te, Ge—Sb—Te—Bi, Ge—Sb—Te—Co, Ge—Sb—Te—Au, Zn—Ge—In—Sb—Te, or such a system doped with nitrogen, oxygen, or another gas additive or doped with Pd can be mentioned.

As the first dielectric layer 45 on the recording layer 44, for example, a ZnS—SiO$_2$ layer having a refractive index n=2.16 and a thickness of 100 nm is used. The first dielectric layer 45 functions as a protective layer of the phase changing recording layer 44.

As the third dielectric layer 46 on the first dielectric layer 45, for example, a $SiO_2$ layer having a refractive index n=1.47 and a thickness of 15 nm is used. As the fourth dielectric layer 47 on the third dielectric layer 46, for example, a SiN layer having a refractive index n=2.0 and a thickness of 50 nm is used. As the fifth dielectric layer 48 on the fourth dielectric layer 47, for example, a $SiO_2$ layer having a refractive index n=1.47 and a thickness of 200 nm is used.

By making the above configuration of the third dielectric layer 46, the fourth dielectric layer 47 and the fifth dielectric layer 48, it is possible to make the surface of the first dielectric layer 45 prevent reflection of light focused from a lens of a high NA.

When a layer composed of organic material is formed at the outermost layer of the optical disk, a sufficient surface hardness for polishing cannot be obtained. Therefore, if protruding defects occur when forming a layer, it is not possible to eliminate the defects and flatten the surface. As opposed to this, according to the optical disk of the present embodiment, since the fifth dielectric layer 48 comprised of $SiO_2$ is formed at the outermost layer, it is possible to polish and flatten the surface.

Also, by increasing the thickness of the fifth dielectric layer 48 to about 100 nm or more, it is possible to increase a margin of accuracy in the polishing process. In other words, it is possible to prevent damage or the like to an underlayer due to unevenness of polishing as the case of polishing a thin layer having a thickness of about several 10 nm.

According to the film configuration of the above present embodiment, since the outermost layer of the disk is covered with a thick $SiO_2$ layer, the surface hardness is high and the recording layer of the optical disk is not easily damaged when the head or optical system and the disk collide.

Also, according to the optical recording medium of the present embodiment, an enhancement condition using multiple interference is satisfied. Therefore, even if the antireflection multilayer film 49 is formed at the outermost layer, the optical characteristics of the optical disk do not decline.

Also, according to the optical recording medium of the present embodiment, since the antireflection multilayer film 49 is formed on the surface of the optical disk, it is not necessary to provide an antireflection coating on the lens side. Therefore, it is possible to prevent damage to the antireflection coating due to collision of the optical disk and the lens and constant effect of the damage of the antireflection coating at the time of recording and reproduction.

Further, according to the optical recording medium of the present embodiment, it is possible to polish the surface. Therefore, the surface can be flattened relatively easily.

Also, when the optical recording medium of the present embodiment is combined with a light source and a near-field high NA optical system, the optical recording and reproduction device of the present invention can be configured.

(Second Embodiment)

In the phase change type optical disk of the above first embodiment, the reflectance of the surface of the first dielectric layer 45 was calculated with the air layer between the lens and the surface of the disk regarded as a thin layer having a refractive index n=1 and a thickness of t when light from an optical part (lens) of n=1.8 strikes the disk via the air layer of a thickness t with various incident angles. The calculation was performed with an incident angle of 0°, 10°, 20°, 30°, 40°, or 50°. The results of calculation are shown in FIG. 8.

Figure 8:
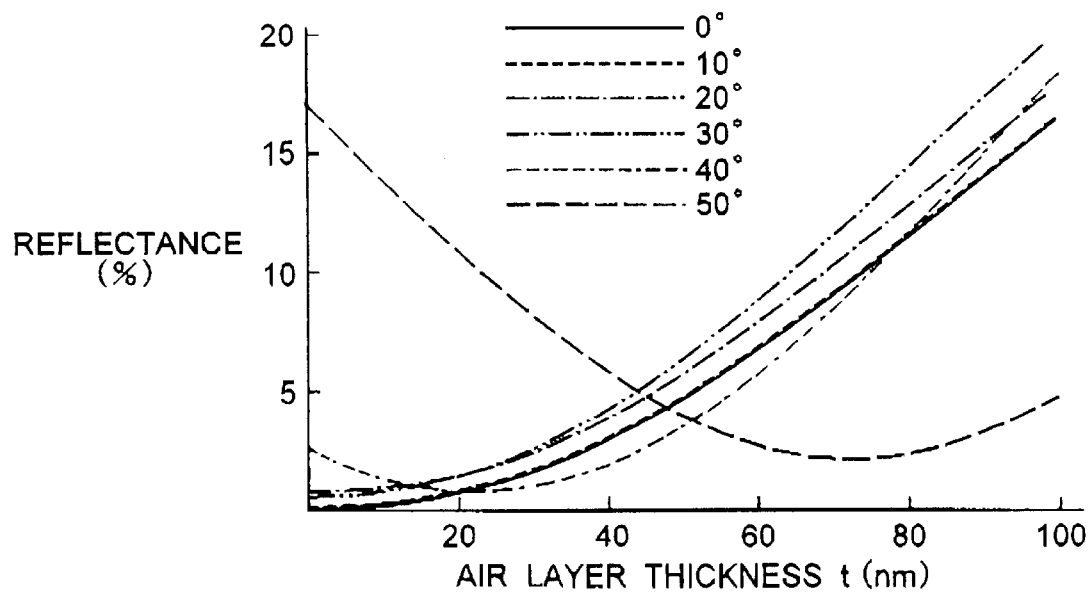
FIG. 8 is a view of the characteristics of the optical recording medium of the second embodiment of the present invention showing the reflectance of the surface of the first dielectric layer when changing the incident angle.

As shown in FIG. 8, when the thickness t of the air layer is about 50 nm, since the antireflection multilayer film 49 is formed, the reflectance of the surface of the first dielectric layer 45 with respect to light having an incident angle of within 50° is 10% or less. Compared with a conventional example of FIG. 4, the reflectance of the surface of the first dielectric layer 45 is remarkably decreased. Also, as shown in FIG. 8, a change of the reflectance along with a change of the thickness t of the air layer is moderated and the change of distribution of energy of light at the disk surface is suppressed.

Figure 9:
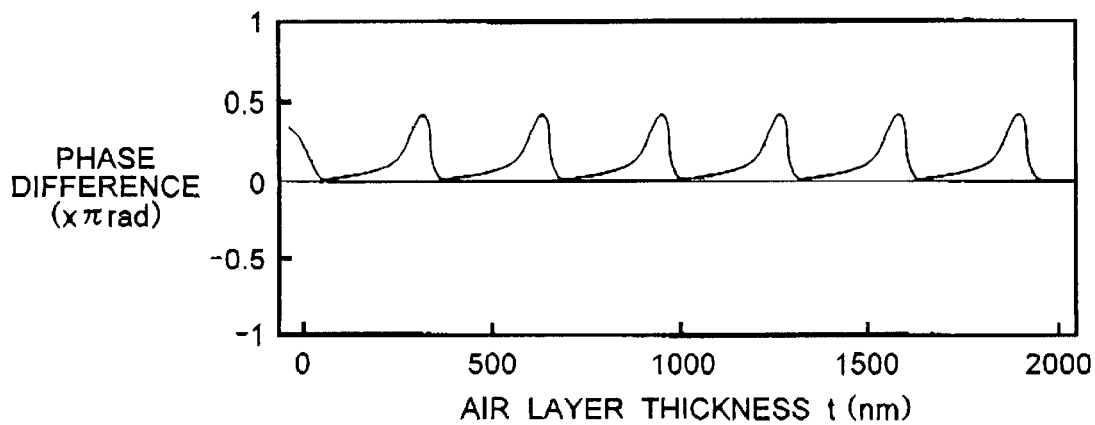
FIG. 9 is a view of the characteristics of the optical recording medium of the second embodiment of the present invention showing the relation of the thickness of the air layer and the phase difference.

Also, in a phase change type optical disk, there is also a problem of effects of the optical phase difference on the signal or tracking. FIG. 9 shows the relation of the thickness t of the air layer and the optical phase difference in the case of the film configuration of the above present embodiment. In the actual near-field optical disk device, the distance t between the lens and the surface of the disk is often set to about 50 to 100 nm. As shown in FIG. 9, according to the film configuration of the present embodiment, when the thickness t of the air layer is about 50 to 250 nm, the optical phase difference is small and the change of the phase is also suppressed.

Figure 10:
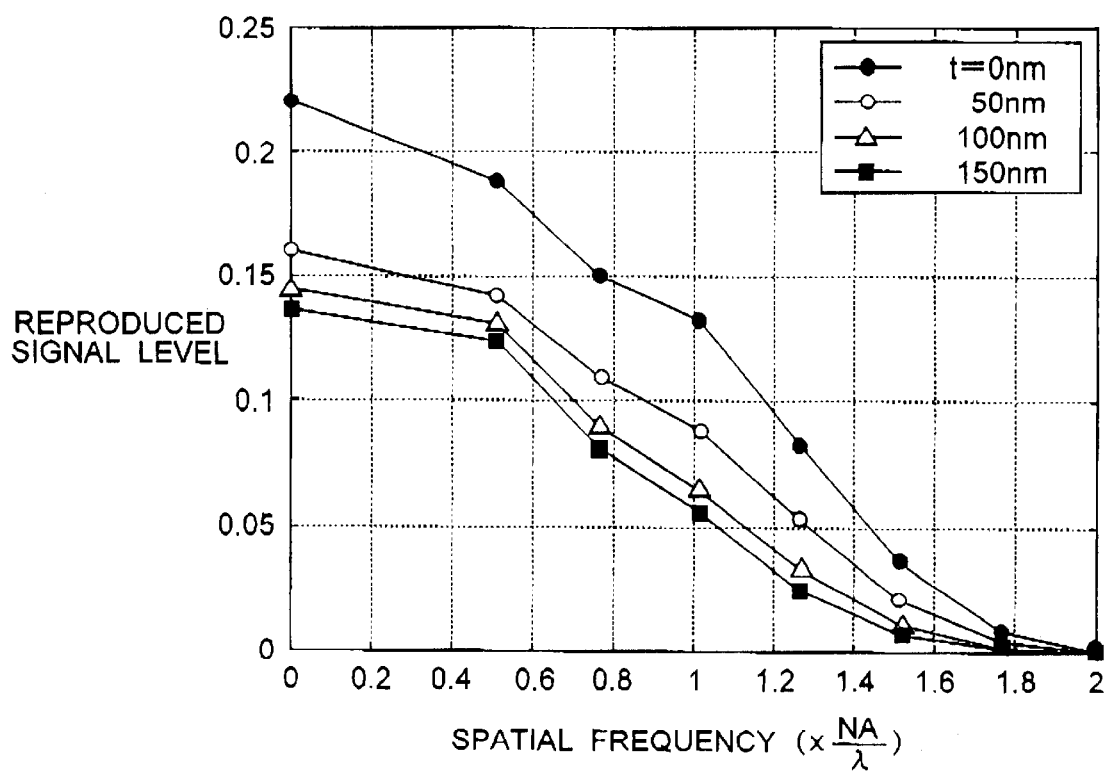
FIG. 10 is a view of the characteristics of the optical recording medium of the second embodiment of the present invention showing the dependency of the reproduced signal level on the spatial frequency.

In the phase change type optical disk of the above first embodiment, the intensity of the reproduced signals was calculated with an air layer between the lens and the surface of the disk regarded as a thin layer having a refractive index n=1 and a thickness of t when light from an optical part (lens) of n=1.8 strikes the disk with various incident angles. The calculation was performed with a thickness t of the air layer of 0 nm, 50 nm, 100 nm, and 150 nm. The results of calculation, that is, the dependency of the reproduced signal on the spatial frequency, are shown in FIG. 10. The reproduced signal level of the ordinate is a value equivalent to MTF expressing the normalized intensity of the reproduced signal.

Figure 1:
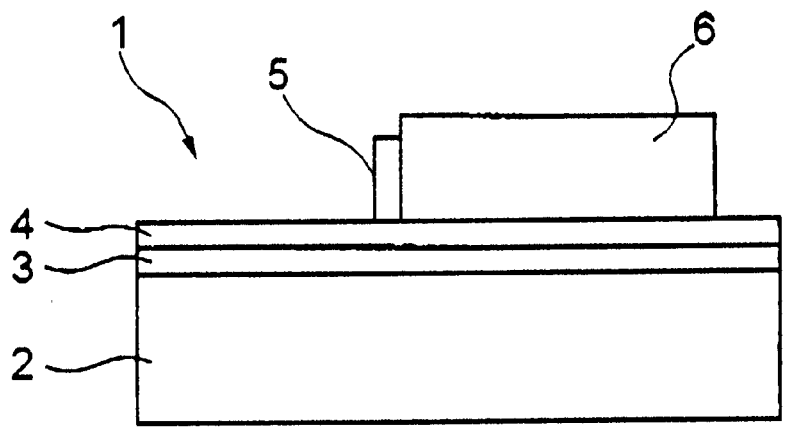
FIG. 1 is a schematic view of a magnetic recording device (hard disk) of the related art.
Figure 2:
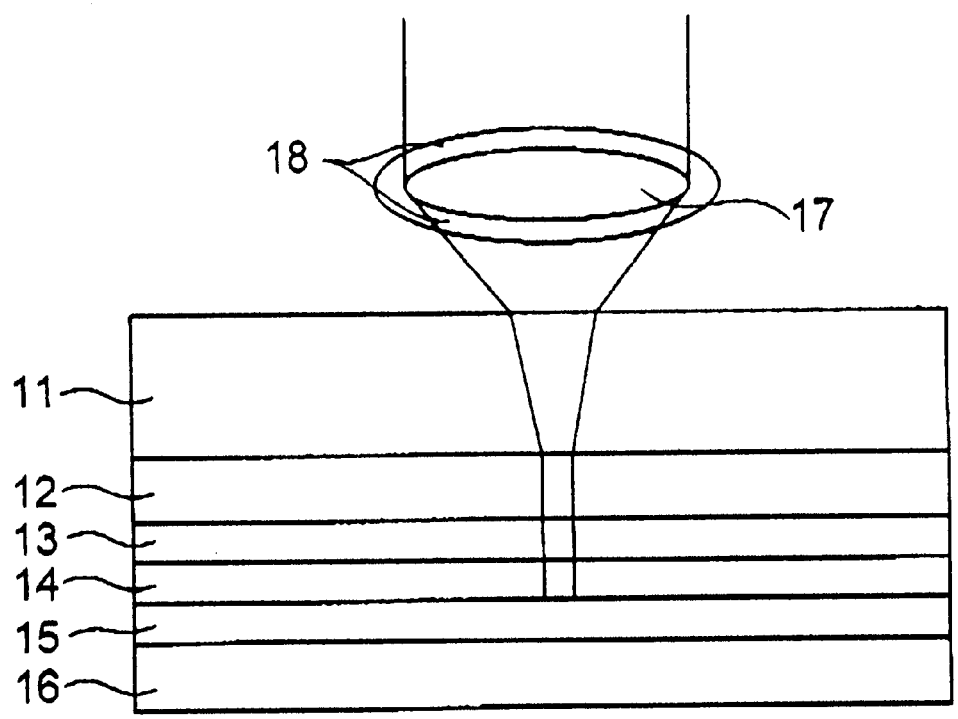
FIG. 2 is a cross-sectional view of an optical recording medium of the related art used in a state wherein the disk and the optical system are sufficiently separated.
Figure 3:
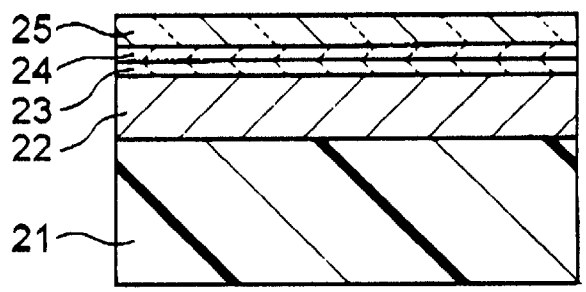
FIG. 3 is a cross-sectional view of a near-field optical recording medium of the related art.
Figure 4:
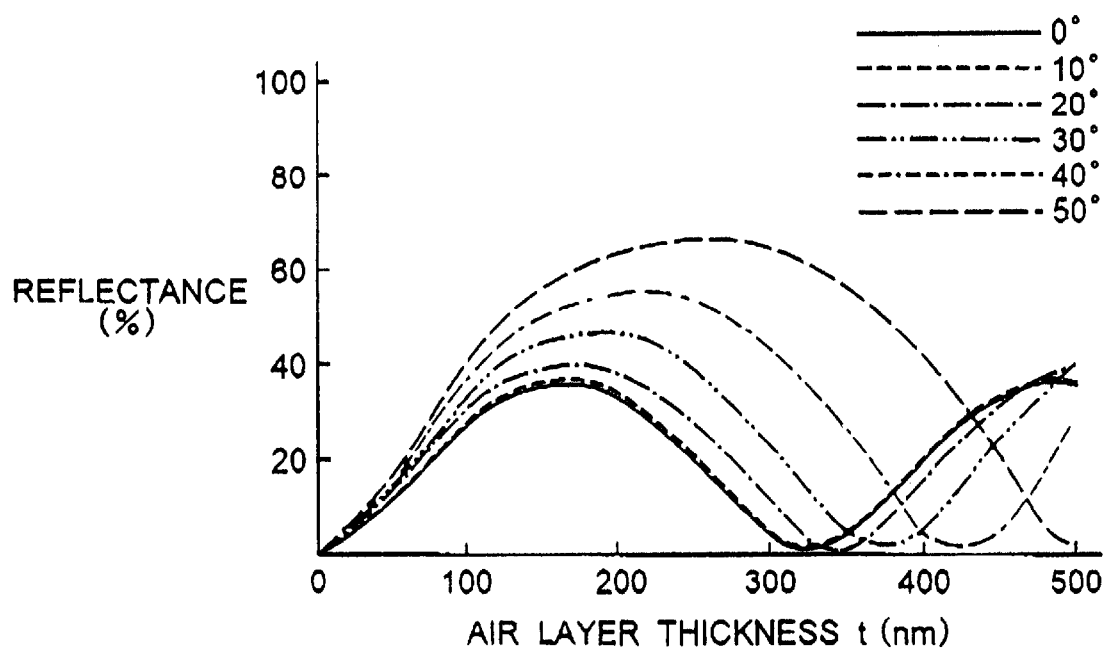
FIG. 4 is a view of characteristics of the near-field optical recording medium of the related art showing the reflectance of the surface of the first dielectric layer when changing the incident angle.
Figure 5:
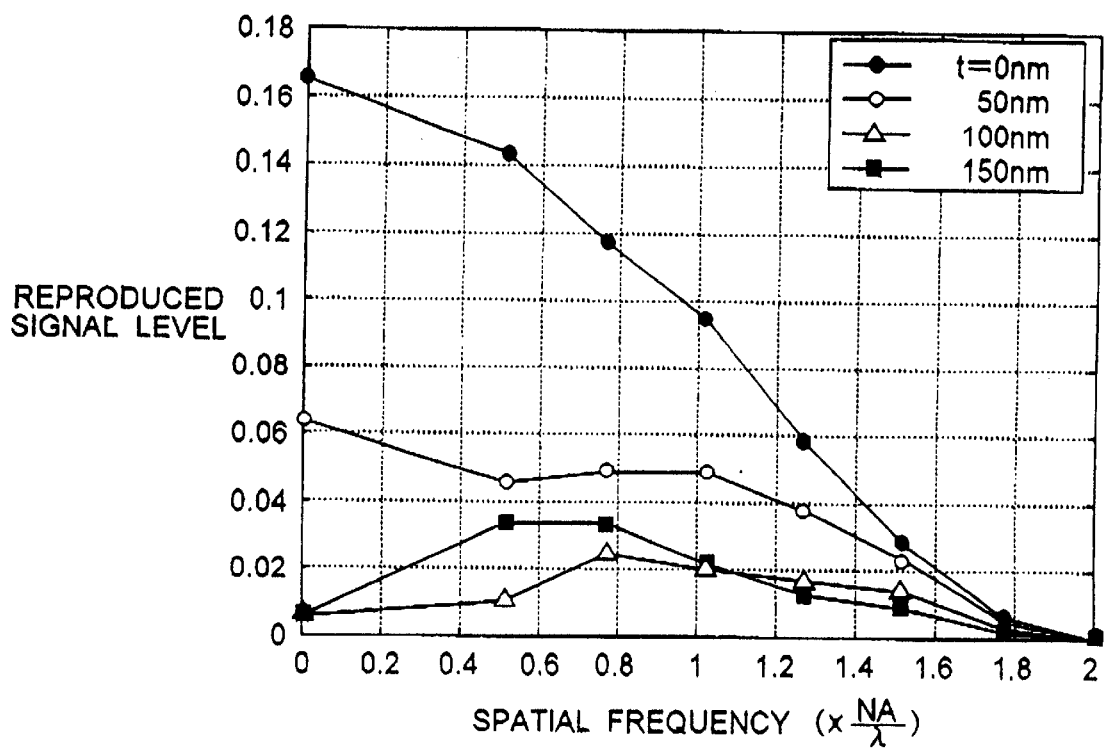
FIG. 5 is a view of the characteristics of the near-field optical recording medium of the related art showing the dependency of the reproduced signal level on the spatial frequency.

In the case of the conventional film configuration shown in FIG. 4, when increasing the thickness t of the air layer, the reproduced signal level decreases. On the other hand, as shown in FIG. 10, according to the film configuration of the present embodiment, the decrease of the reproduced signal level is suppressed and the reproduced signal level is remarkably improved in all cases of t=50 nm, 100 nm, and 150 nm. Therefore, the range of the thickness t of the air layer wherein a good reproduced signal level can be obtained, that is, an allowable range of the distance between the disk and an optical system, expands.

Due to this, if the distance t between the optical system and the surface of the disk slightly fluctuates, for example, during disk rotation, a great change of the optical characteristics is suppressed.

Also, compared with an optical disk of the conventional film configuration, when the distance t between the disk and the optical system is increased to a certain amount, good reproduced signals can be obtained. Therefore, it is not necessary to decrease the distance between the optical system and the disk as small as possible. It is also possible to prevent contact or collision of the optical system with the disk.

In the optical disk of the present embodiment, the antireflection multilayer film 49 has to be one where the surface of the first dielectric layer 45 prevents reflection of the focused light (antireflection condition). For comparison with the above present embodiment, a stacked film not satisfying the above antireflection condition was formed instead of the antireflection multilayer film 49. The dependency of the reproduced signals on the spatial frequency was calculated in the same manner as FIG. 10. The results of calculation are shown in FIG. 11 and FIG. 12.

The stacked film not satisfying the above antireflection condition is one of the film configuration of the first embodiment shown in FIG. 7 with the thicknesses of the third dielectric layer 46 and the fifth dielectric layer 48 changed. Specifically, it is structured with a $SiO_2$ layer as the third dielectric layer 46 having a thickness of 115 nm, a SiN layer as the fourth dielectric layer 47 having a thickness of 50 nm, and a $SiO_2$ layer as the fifth dielectric layer 48 having a thickness of 100 nm stacked together.

Also, for satisfying the enhancement condition of the multilayer film formed on the substrate 41, the thickness of the first dielectric layer 45 was changed to 83 nm. The composition and the thickness of the layers not described above are same as in the first embodiment.

Figure 11:
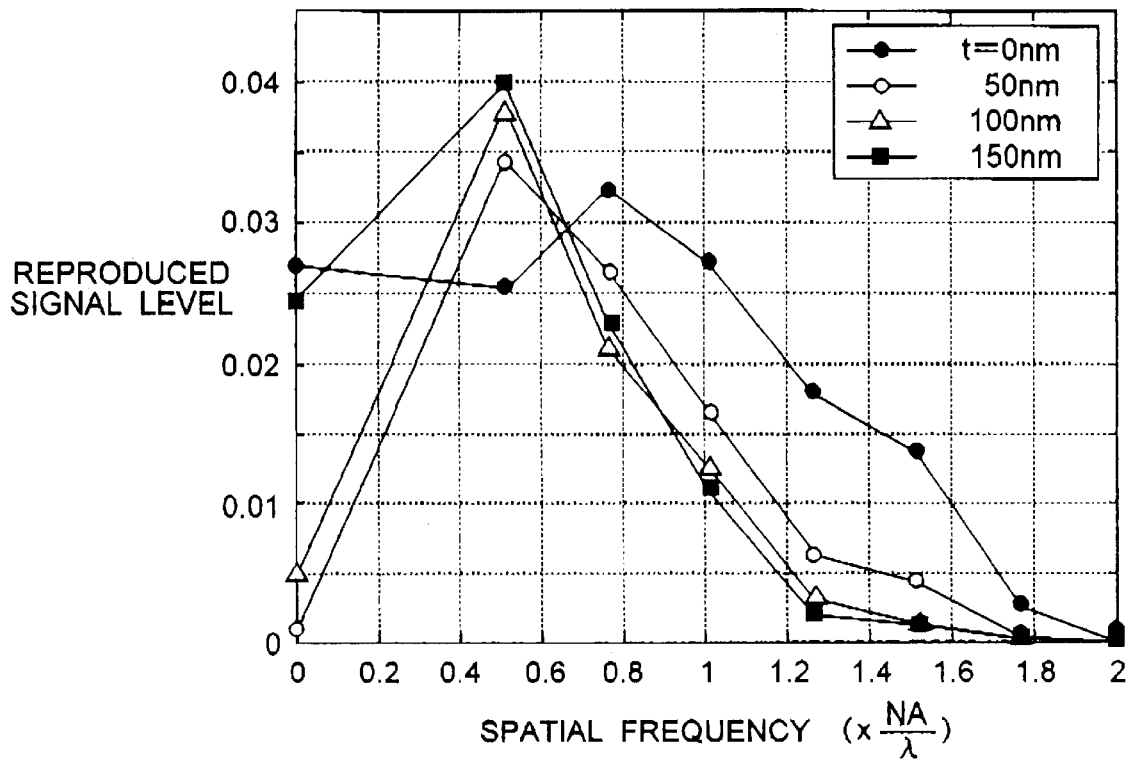
FIG. 11 is a view of the characteristics of an optical recording medium shown as a comparative example in the second embodiment of the present invention showing the dependency of the reproduced signal level on the spatial frequency.
Figure 12:
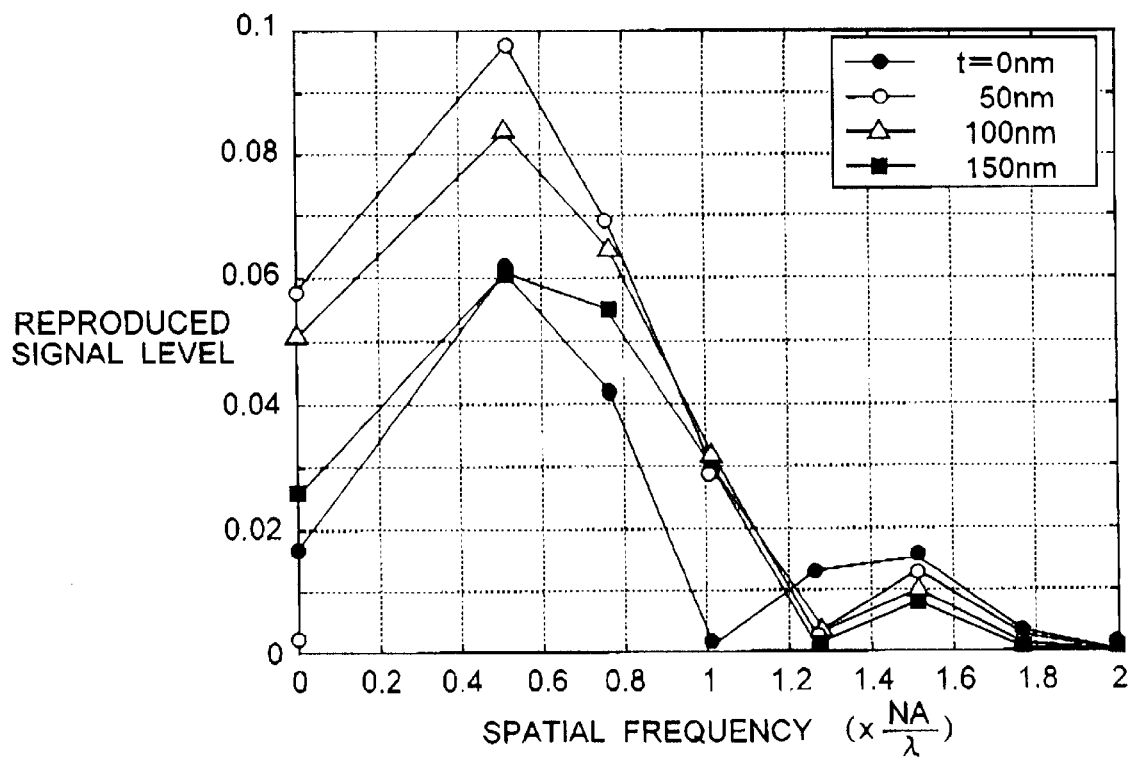
FIG. 12 is a view of the characteristics of an optical recording medium shown as a comparative example in the second embodiment of the present invention showing the dependency of the reproduced signal level on the spatial frequency.

FIG. 11 and FIG. 12 show the reproduced signal level at two points wherein high carrier levels can be obtained in the above film configuration not satisfying the antireflection condition when the amount of defocus is changed. When FIG. 11 and FIG. 12 are compared with FIG. 10, the reproduced signal levels are drastically decreased. As described above, when the stacked film formed on the first dielectric layer 45 does not satisfy the predetermined antireflection condition, it is not possible to suppress decrease of the reproduced signal level along with the fluctuation of the thickness t of the air layer.

(Third Embodiment)

FIG. 7 is a cross-sectional view of an optical recording medium of the present embodiment. The present embodiment is a magneto-optical disk used for light of a wavelength of 650 nm. The optical disk shown in FIG. 7 is structured with a reflective layer 42, a second dielectric layer 43, a recording layer 44, and a first dielectric layer 45 sequentially stacked on a substrate 41 and, further, a third dielectric layer 46, a fourth dielectric layer 47, and a fifth dielectric layer 48 sequentially stacked on them.

On the optical disk of the present embodiment, in the same manner as the first embodiment, laser light is focused from the side at which the fifth dielectric layer 48 is formed. The laser light strikes the optical disk with the line passing through the center of the beam diameter (beam waist) perpendicular to the surface of the disk.

In the optical disk of FIG. 7, the stacked film (antireflection multilayer film) 49 comprised of the third dielectric layer 46, the fourth dielectric layer 47, and the fifth dielectric layer 48 is designed for preventing reflection of light from the optical system (lens) in various angles at the surface of the first dielectric layer 45.

The stacked film combined of the four layers of the first dielectric layer 45, the recording layer 44, the second dielectric layer 43, and the reflective layer 42 and the antireflection multilayer film 49 described above satisfy the enhancement condition of the light perpendicularly striking the disk surface (perpendicularly incident component). The design is optimized for making contrast higher for the perpendicularly incident component.

The specific film configuration of the magneto-optical disk of the present embodiment is as follows.

As the substrate 41, for example, a glass substrate is used. As the reflective layer 42 on the substrate 41, for example, an Al-alloy layer having a thickness of 120 nm is used. As the second dielectric layer 43 on the reflective layer 42, for example, a SiN layer having a refractive index n=2.0 and a thickness of 20 nm is used.

As the recording layer 44 on the second dielectric layer 43, for example, a Gd—Fe—Co layer having a refractive index n=2.86 and a thickness of 4 nm or a Tb—Fe—Co layer having a refractive index n=3.13 and a thickness of 20 nm is used. For the recording layer 44, an amorphous alloy or another material able to be changed in magnetization state by focusing of laser light is suitably selected.

As the first dielectric layer 45 on the recording layer 44, for example, a SiN layer having a refractive index n=2.0 and a thickness of 100 nm is used.

As the third dielectric layer 46 on the first dielectric layer 45, for example, a $SiO_2$ layer having a refractive index n=1.47 and a thickness of 10 nm is used. As the fourth dielectric layer 47 on the third dielectric layer 46, for example, a SiN layer having a refractive index n=2.0 and a thickness of 50 nm is used. As the fifth dielectric layer 48 on the fourth dielectric layer 47, for example, a $SiO_2$ layer having a refractive index n=1.47 and a thickness of 200 nm is used.

By using the above configuration of the third dielectric layer 46, the fourth dielectric layer 47, and the fifth dielectric layer 48, it is possible to make the surface of the first dielectric layer 45 prevent reflection of light focused from a lens of a high NA.

In the magneto-optical disk of the above third embodiment, the reflectance of the surface of the first dielectric layer 45 was calculated with an air layer between the lens and the surface of the disk regarded as a thin layer having a refractive index n=1 and a thickness of t when light from an optical part (lens) of n=1.8 strikes the disk via the air layer of a thickness t with various incident angles. The calculation was performed with an incident angle of 0°, 10°, 20°, 30°, 40°, or 50°. The results of calculation are shown in FIG. 13.

Figure 13:
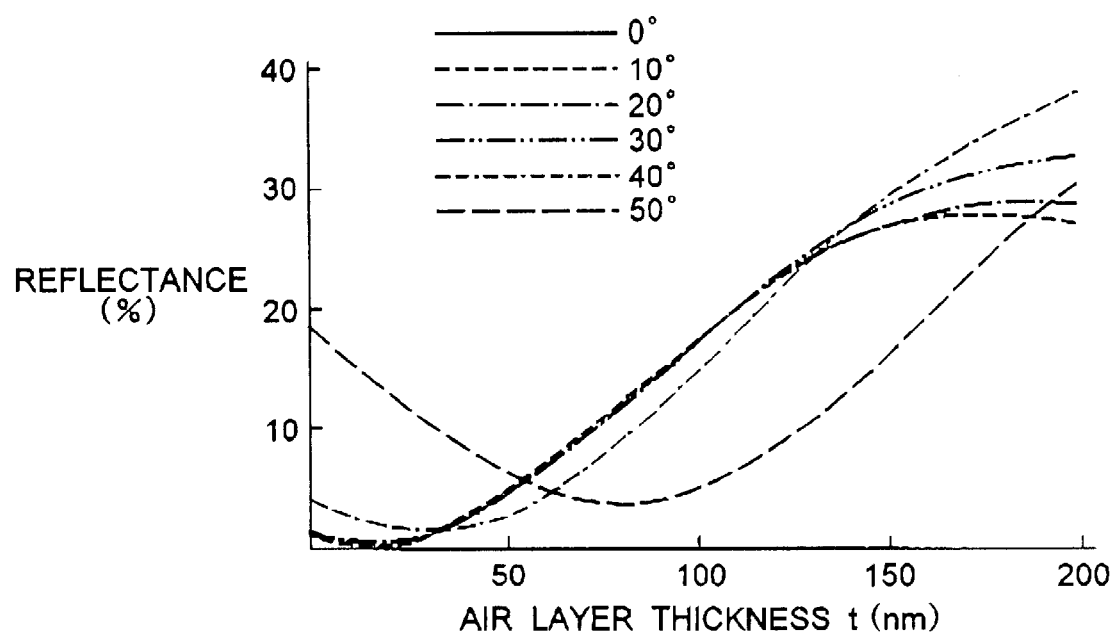
FIG. 13 is a view of the characteristics of the optical recording medium of the third embodiment of the present invention showing the reflectance of the surface of the first dielectric layer when changing the incident angle.

As shown in FIG. 13, when the thickness t of the air layer is about 50 nm, since the antireflection multilayer film 19 is formed, the reflectance of the surface of the first dielectric layer 45 is 10% or less with respect to light having an incident angle of 50° or less. Also, as shown in FIG. 13, a change of the reflectance along with a change of the thickness t of the air layer is moderated and a change of distribution of energy of light on the disk surface is suppressed.

(Fourth Embodiment)

Below, a method of producing an optical recording medium shown in the above first embodiment and third embodiment will be explained.

A plastic substrate used often as a substrate 41 of the optical disk is formed by high speed injection of heated and melted resin to fill a mold provided with a stamper, then cooling it.

The reflective layer 42 is formed on the surface of the substrate 41 by for example sputtering. The sputtering is for example ion beam sputtering. After forming the reflective layer 42, a ZnS—$SiO_2$ layer or SiN layer serving as the second dielectric layer 43, a Ge—Sb—Te layer or Gd—Fe—Co layer serving as the recording layer 44, and a ZnS—$SiO_2$ layer or SiN layer serving as the first dielectric layer 45 are sequentially formed by sputtering.

A $SiO_2$ layer serving as the third dielectric layer 46 and a SiN layer serving as the fourth dielectric layer 47 are formed by for example sputtering. On the fourth dielectric layer 47, a fifth dielectric layer 48 comprised of SiO$_2$ or another material is formed by for example sputtering. Since the fifth dielectric layer 48 formed as above is comprised of an inorganic material, it is possible to polish the surface as opposed to the case of using for example an ultraviolet ray curing resin or other organic material.

When the fifth dielectric layer 48 is formed by sputtering, protruding defects may occur due to abnormal discharge etc. By performing for example FTP (flying tape polishing) on the surface with the protruding defects, it is possible to remove the protruding parts and flatten the surface.

According to the method of producing an optical recording medium of the above present embodiment, by just adding the steps of forming the third through fifth dielectric layers and the step of polishing the fifth dielectric layer to the conventional method of production, it is possible to produce an optical disk resistant to damage to the surface of the disk due to collision with a head.

Also, according to the method of producing an optical recording medium of the present embodiment, by performing the FTP polishing, the surface of the disk can be flattened in a short time. Therefore, it is possible to produce an optical disk not damaging to the optical system or head by a simplified process and in a short time.

The embodiments of the optical recording medium, the method of producing the same, and the optical recording and reproduction device of the present invention are not limited to the above explanation. For example, in the above embodiments, while the refractive index of the optical part arranged in proximity to the optical recording medium was made n=1.8, it is possible to use the optical recording medium of the present invention with an optical part having any refractive index. Also, it is possible to apply the present invention to an optical disk using a dye in the recording layer. Further, the optical recording medium of the present invention can be either rewritable or read-only.

In addition, various modifications may be made within a range not outside the gist of the present invention.

Summarizing the effects of the present invention, according to the optical recording medium and the optical recording and reproduction device of the present invention, it is possible to decrease the reflectance of the protective layer on the recording layer, increase the coupling efficiency of the focused light, and increase the intensity of the reproduced signals.

According to the optical recording medium and the optical recording and reproduction device of the present invention, it is possible to prevent a decrease in intensity of the reproduced signals along with fluctuation of the distance between the optical recording medium and an optical system.

Also, according to the optical recording medium and the optical recording and reproduction device of the present invention, it is possible to prevent damage to the optical recording medium due to contact or collision of the near-field optical recording medium and an optical system.

According to the method of producing an optical recording medium of the present invention, it is possible to form a near-field optical recording medium able to obtain a high intensity reproduced signals and resistant to damage to the surface by a simplified process.

What is claimed is:

1. An optical recording medium used in a near field condition, comprising:

a substrate, a recording layer formed on the substrate, a first protective layer formed on the recording layer, and an antireflection multilayer film formed on the first protective layer for preventing reflection of light at the surface of the first protective layer and having predetermined optical characteristics for moderating a change of a reproduced signal intensity responsive to fluctuation of the near field condition.

2. An optical recording medium as set forth in claim 1, wherein the predetermined optical characteristics are determined by a refractive index and thickness of each layer comprising the antireflection multilayer film.

3. An optical recording medium as set forth in claim 1, wherein the antireflection multilayer film comprise at least two layers and the outermost layer of the antireflection multilayer film has a surface hardness able to be polished.

4. An optical recording medium as set forth in claim 3, wherein the outermost layer of the antireflection multilayer film comprises a silicon oxide layer.

5. An optical recording medium as set forth in claim 4, wherein a thickness of the silicon oxide layer is about 100 nm or more.

6. An optical recording medium as set forth in claim 4, wherein the antireflection multilayer film comprises a plurality of silicon oxide layers.

7. An optical recording medium as set forth in claim 1, wherein a surface of the antireflection multilayer film is flattened and has no protruding defects.

8. An optical recording medium as set forth in claim 1, wherein a reflective layer comprised of metal or semimetal is formed between the substrate and the recording layer.

9. An optical recording medium as set forth in claim 1, further comprising a second protective layer between the substrate and the recording layer.

10. An optical recording medium as set forth in claim 1, wherein the recording layer comprises a material undergoing a phase change and changing in a complex index of refraction by focusing of light.

11. An optical recording medium as set forth in claim 1, wherein the recording layer comprises a material changing in magnetization state by focusing of light and enabling detection of the change as a change of a polarization state.

12. An optical recording medium as set forth in claim 1, wherein the recording layer comprises an organic dye material changing in a complex index of refraction or shape with respect to a wavelength of the reproducing light by focusing of light.

13. An optical recording medium as set forth in claim 1, wherein the recording layer comprises pits formed on a surface of the substrate and said optical recording medium is a read-only medium.

14. An optical recording and reproduction device comprising:

a light source, an optical recording medium, and an optical system focusing light from the light source to the optical recording medium at a near field distance from the optical recording medium, the medium comprising a substrate, a recording layer formed on the substrate, a first protective layer formed on the recording layer, and an antireflection multilayer film formed on the first protective layer for preventing reflection of the light at a surface of the first protective layer and having predetermined optical characteristics moderating a change of reproduced signal intensity along with fluctuation of the distance, and said device performing at least one of recording and reproduction of information by focusing light from the optical system to the recording layer via a side of the optical recording medium at which the antireflection multilayer film is formed.

15. An optical recording and reproduction device as set forth in claim 14, wherein the predetermined optical characteristics are determined by a refractive index and thickness of each layer comprised of the antireflection multilayer film.

16. An optical recording and reproduction device as set forth in claim 14, wherein the antireflection multilayer film comprise at least two layers and the outermost layer of the antireflection multilayer film has a surface hardness able to be polished.

17. An optical recording and reproduction device as set forth in claim 16, wherein the outermost layer of the antireflection multilayer film comprises a silicon oxide layer.

18. An optical recording and reproduction device as set forth in claim 17, wherein a thickness of the silicon oxide layer is about 100 nm or more.

19. An optical recording and reproduction device as set forth in claim 17, wherein the antireflection multilayer film comprise a plurality of silicon oxide layers.

20. An optical recording and reproduction device as set forth in claim 14, wherein a surface of the antireflection multilayer film is flattened and has no protruding defects liable to damage the optical system.

21. An optical recording and reproduction device as set forth in claim 14, wherein a reflective layer comprised of metal or semimetal is formed between the substrate and the recording layer.

22. An optical recording and reproduction device as set forth in claim 14, further comprising a second protective layer between the substrate and the recording layer.

23. An optical recording and reproduction device as set forth in claim 14, wherein the recording layer comprises a material undergoing a phase change and changing in a complex index of refraction by said focusing of light.

24. An optical recording and reproduction device as set forth in claim 14, wherein the recording layer comprises a material changing in magnetization state by said focusing of light and enabling detection of the change as a change of a polarization state.

25. An optical recording and reproduction device as set forth in claim 14, wherein the recording layer comprises an organic dye material changing in a complex index of refraction or shape with respect to a wavelength of the reproducing light by said focusing of light.

26. An optical recording and reproduction device as set forth in claim 14, wherein the recording layer comprises pits formed on a surface of the substrate and said optical recording medium is read-only medium.

* * * * *